US010454826B2

United States Patent
Ellouze et al.

(10) Patent No.: US 10,454,826 B2
(45) Date of Patent: Oct. 22, 2019

(54) TECHNIQUE FOR SIGNALLING CONGESTION IN A PACKET COMMUNICATION NETWORK

(71) Applicant: Orange, Paris (FR)

(72) Inventors: Selim Ellouze, Creteil (FR); Emile Stephan, Pleumeur Bodou (FR); Xavier Marjou, Lannion (FR)

(73) Assignee: ORANGE, Paris (FR)

( * ) Notice: Subject to any disclaimer, the term of this patent is extended or adjusted under 35 U.S.C. 154(b) by 232 days.

(21) Appl. No.: 15/106,650

(22) PCT Filed: Dec. 16, 2014

(86) PCT No.: PCT/FR2014/053362
§ 371 (c)(1),
(2) Date: Jun. 20, 2016

(87) PCT Pub. No.: WO2015/092260
PCT Pub. Date: Jun. 25, 2016

(65) Prior Publication Data
US 2016/0337240 A1 Nov. 17, 2016

(30) Foreign Application Priority Data
Dec. 20, 2013 (FR) ...................................... 13 63336

(51) Int. Cl.
*H04L 12/26* (2006.01)
*H04L 12/801* (2013.01)
*H04L 12/851* (2013.01)

(52) U.S. Cl.
CPC .............. *H04L 47/11* (2013.01); *H04L 47/24* (2013.01); *H04L 47/33* (2013.01)

(58) Field of Classification Search
None
See application file for complete search history.

(56) References Cited

U.S. PATENT DOCUMENTS

| 2006/0092836 | A1* | 5/2006 | Kwan | H04L 47/10 370/229 |
| 2006/0126509 | A1* | 6/2006 | Abi-Nassif | H04L 47/10 370/235 |

(Continued)

OTHER PUBLICATIONS

International Search Report dated Mar. 26, 2015 for corresponding International Application No. PCT/FR2014/053362, filed Dec. 16, 2014.

(Continued)

*Primary Examiner* — Kwang B Yao
*Assistant Examiner* — Juvena W Loo
(74) *Attorney, Agent, or Firm* — David D. Brush; Westman, Champlin & Koehler, P.A.

(57) ABSTRACT

A method for signaling a piece of congestion information regarding a first data stream routed by a first node in a network. The method includes the following acts implemented by a second node via which the first data stream and at least a second data stream are routed: obtaining a piece of congestion information regarding the second data stream, the congestion information indicating that a third node, via which the first data stream is routed, has detected a congestion situation for a routing of the second stream in a data transfer plane; checking that the first data stream has a priority level lower than that of the second data stream; and sending, to the first node, a control message in a control plane, the control message carrying the congestion information.

9 Claims, 3 Drawing Sheets

(56) References Cited

U.S. PATENT DOCUMENTS

| | | | | |
|---|---|---|---|---|
| 2007/0081454 | A1* | 4/2007 | Bergamasco | H04L 47/10 370/229 |
| 2007/0127378 | A1* | 6/2007 | Yang | H04L 43/00 370/235 |
| 2007/0153695 | A1* | 7/2007 | Gholmieh | H04L 43/0882 370/235 |
| 2007/0183332 | A1* | 8/2007 | Oh | H04L 47/10 370/236 |
| 2009/0285099 | A1 | 11/2009 | Kahn et al. | |
| 2010/0177633 | A1* | 7/2010 | Bader | H04L 47/10 370/230 |
| 2013/0010598 | A1* | 1/2013 | Ludwig | H04L 47/10 370/235 |
| 2014/0269320 | A1* | 9/2014 | DeCusatis | H04L 47/11 370/236 |
| 2017/0149665 | A1* | 5/2017 | Yousaf | H04L 47/115 |

OTHER PUBLICATIONS

C Chrysostomou et al., "Differentiated Services Congestion Control in TCP/IP Networks using Fuzzy Logic" Jul. 6, 2006 (Jul. 6, 2006) XP055153693.

Ramakrishnan Teraoptic Networks S Floyd Aciri D Black EMC K, "The Addition of Explicit Congestion Notification (ECN) to IP; rfc3168.txt", Sep. 1, 2001, Sep. 1, 2001 (Sep. 1, 2001) XP015008949.

Written Opinion dated Mar. 26, 2015 for corresponding International Application No. PCT/FR2014/053362, filed Dec. 16, 2014.

S. Blake et al., "An Architecture for Differentiated Services" RFC2475, Dec. 1998.

K. Nichols et al., "Definition of the Differentiated Services Field (DS Field) in the IPv4 and IPv6 Headers" RFC2474, Dec. 1998.

A. Kuzmanovic et al., "Adding Explicit Congestion Notification (ECN) Capability to TCP's SYN/ACK Packets" RFC5562, Jun. 2009.

English translation of the International Written Opinion Written Opinion dated Mar. 26, 2015 for corresponding International Application No. PCT/FR2014/053362, filed Dec. 16, 2014.

J. Postel, "Internet Control Message Protocol, DARPA Internet Program Protocol Specification" RFC 792, Sep. 1981.

R. Bonica et al., "Extended ICMP to Support Multi-Part Messages", RFC 4884, Apr. 2007.

R. Bonica et al., "ICMP Extensions for Multiprotocol Label Switching" RFC 4950, Aug. 2007.

* cited by examiner

TECHNIQUE FOR SIGNALLING CONGESTION IN A PACKET COMMUNICATION NETWORK

CROSS-REFERENCE TO RELATED APPLICATIONS

This application is a Section 371 National Stage Application of International Application No. PCT/FR2014/053362, filed Dec. 16, 2014, the content of which is incorporated herein by reference in its entirety, and published as WO 2015/092260 on Jun. 25, 2015, not in English.

FIELD OF THE DISCLOSURE

The invention lies in the field of packet communication networks and more particularly concerns a technique for signaling congestion from one node in a communication network to another node in this network.

BACKGROUND OF THE DISCLOSURE

Congestion can occur on any equipment situated on the path taken by a packet. More precisely, a piece of equipment can be congested at input or output memories, internal queues, etc.

Congestion notification functions have been defined by standardization organizations for packet communication networks. These functions are based on various mechanisms, among which there may be cited an explicit congestion notification mechanism ECN, a forward explicit congestion notification mechanism FECN, a backward explicit congestion notification mechanism BECN or even combinations of these various mechanisms. The term "forward" corresponds to the direction of transmission of a packet, that is to say toward the recipient of the packet, and the term "backward" corresponds to the opposite direction of transmission of the packet, that is to say toward the transmitter of the packet. These various mechanisms use a header field of the data packets to carry a piece of information relating to the congestion of one of the nodes conveying the packet. Thus, this piece of information relating to the congestion is transmitted in a transfer plane relating to the transport of the data. By way of example, for a packet communication network of IP, for "Internet Protocol", type, the document RFC 3168 from the IETF, for "Internet Engineering Task Force", specifies the way in which an IP packet carries an explicit congestion notification ECN forward. Such an IP packet will subsequently be called a marked packet.

These explicit notification mechanisms have certain disadvantages, however. Once marked, a packet needs to arrive at its recipient so that the information relating to the congestion can be returned to the transmitter by means of an acknowledgement, for example, when the notification mechanism is implemented with the TCP, for "Transmission Control Protocol", protocol as defined in a document RFC 5562 from the IETF. This causes a delay in the signaling of the congestion to the transmitter and thus in the processing thereof. This also results in a delay in the transmitter taking measures to prevent or resolve the congestion. Moreover, marking with the information relating to the congestion is carried out using statistical methods. The packets to be marked are chosen from all of the packets conveyed by the queue encountering the congestion situation. In point of fact, congestion may be linked to multiple streams, to the sum total of the streams conveyed by a node or may even be the circumstance of a single stream. It is furthermore the case that congestion can cause a deterioration in the quality of service. By way of example, this deterioration translates into a loss of data packets, or an increase in the latency relating to the sending of the data packets from a transmitting node to a receiving node. By way of example, congestion is detected by virtue of a threshold being reached in a queue that stores packets at the input or output of a node in the network. Depending on the value of this threshold, precongestion or congestion will be referred to. Subsequently, the terms "congestion" and "precongestion" will be used indiscriminately. The expression "congestion information" that is also subsequently used refers to a piece of information indicating the existence of congestion.

SUMMARY

One of the aims of the invention is to overcome inadequacies/disadvantages of the prior art and/or to make improvements thereto.

According to a first aspect, the subject of the invention is a method for signaling a piece of congestion information relating to a first data stream transmitted by a first node in a network, said method comprising the following steps implemented by a second node, by means of which the first data stream and at least one second data stream are conveyed:
  obtaining a piece of congestion information relating to the second data stream, the piece of congestion information indicating that a third node, by means of which the first data stream is conveyed, has detected a congestion situation for conveyance of the second stream in a data transfer plane;
  verifying that the first data stream has a priority level lower than that of the second data stream;
  sending a control message in a command plane to the first node transmitting the first stream, said control message carrying said piece of congestion information.

The signaling method thus allows a node of a network to redistribute a piece of congestion information relating to one stream to the transmitter of another stream. On receiving such signaling, the transmitter can take measures to prevent or resolve the congestion. By way of example, these measures involve reducing the bit rate of the transmitted stream. The method thus allows the conveyance of priority streams to be favored by signaling congestion relating to a particular stream to a transmitter. By way of example, the method allows the congestion to be signaled to a transmitter for which a reduction in the bit rate of the transmitted stream will have the effect of releasing resources of the network for the other streams. This is the case with an FTP, for "File Transfer Protocol", stream, for example, for which reduction of the bit rate for transmitting the data packets simply has the effect, for a user, of postponing the instant of delivery of a data file. The quality of service relating to the conveyance of the data packets belonging to priority streams (e.g. realtime video or audio streams), and the quality of experience received by users of a service provided by means of these streams, are thus preserved. It is also emphasized that since the obtaining of the piece of congestion information is implemented by any node of the network by means of which the first and second streams are conveyed, the piece of congestion information does not need to arrive at one of the nodes receiving these streams in order to be sent to the transmitter of the first stream. A time gain in managing the prevention or resolution of the congestion is obtained. The risk of losing the piece of congestion information is moreover lessened. This is all the more true because the second node is situated close to the node that has detected the congestion. The method thus provides rapid means for preventing or resolving congestion through prioritization of the streams passing through a congested node.

The command plane allows the nodes of the network to interchange control messages so as particularly to see to the correct operation of the transfer plane. The sending of the piece of congestion information in the command plane allows the piece of congestion information to be conveyed to the first node without overloading the resources of the network that are used for transporting the data, particularly owing to a lower frequency for sending the control messages in comparison with the interchanges in the data transfer plane. Preventing overload of the resources of the network becomes particularly important within a congestion context in which these resources can rapidly become precarious. The sending of the piece of congestion information in a command plane furthermore ensures that the method is compatible with all of the data transfer protocols. This facilitates deployment of the method.

According to a particular feature, the signaling method comprises a step of obtaining an identifier of the first node from a data packet belonging to the first stream.

Obtaining an identifier of the first node allows the piece of congestion information to be sent directly to the transmitter of the nonpriority stream.

According to a particular feature, the piece of congestion information is obtained from a data packet belonging to the second stream.

Obtaining the piece of congestion information from a data packet belonging to the second stream allows retrieval of the information relating to the congestion in the data transfer plane. The piece of information thus obtained is closest to the data and provides an indication of an almost realtime state of the congestion.

According to a particular feature, the piece of congestion information is obtained in a command plane from a control message carrying the piece of congestion information.

Obtaining the piece of congestion information in a command plane from a control message allows the second node to respond both to detection of congestion by a node A and to the signaling of congestion by a node B, which is separate from a node that has detected congestion. By way of example, the second node implements the method on obtaining a piece of congestion information directly from a node A of the network that has detected congestion (e.g. router). The method can also be implemented on obtaining the piece of congestion information from a control message transmitted by a node B of the network in order to signal congestion detected by a node C of the network. The method can thus be adapted to various configurations of the network.

According to a particular feature, the signaling method moreover comprises an observation step after the piece of congestion information is sent, at the end of which when the congestion situation is extended to the third node, the verification and sending steps are repeated for a third stream transmitted by a fourth node.

The observation step allows a solution to be provided for a congestion situation that would be extended by successively sending the piece of congestion information to the streams conveyed by the second node in the order from lowest priority to highest priority. A priority stream is thus effected only when none of the measures taken for lower priority streams have allowed a congestion situation to be resolved.

According to a particular feature, in the verification step, the priority level belongs to a group comprising a priority level associated with a data stream, a priority level associated with a transmitter of a data stream, a priority level associated with a user receiving a data stream, a priority level associated with a communication protocol for a data stream, a priority level associated with an application managing a data stream.

Various prioritization criteria can be chosen according to a policy implemented by an operator, for example. A priority level associated with a data stream allows certain types of stream to be favored, such as streams that are more sensitive to packet loss, for example. A priority level associated with a user allows a service guarantee to be provided for certain user profiles as a matter of priority. By way of example, a priority level associated with a protocol type allows an operator to choose to implement a more or less flexible policy for processing congestion, for example by choosing a more flexible policy for a transactional data interchange protocol, and a strict policy for a nontransactional data interchange protocol. A priority level associated with a transmitter of a data stream allows a set of streams transmitted by a particular transmitter to be favored.

According to a second aspect, the invention concerns a node in a network, referred to as "first node", designed to signal a piece of congestion information relating to a first data stream transmitted by a second node, the first data stream and at least one second data stream being conveyed by said first node. This first node comprises:
 a processing module designed to obtain a piece of congestion information relating to the second data stream, said piece of congestion information indicating that a third node, by means of which the first data stream is conveyed, has detected a congestion situation for conveyance of said second stream in a data transfer plane;
 a verification module designed to verify that the first data stream has a priority level lower than that of the second data stream;
 a control module designed to send a control message in a command plane to said second node, said control message carrying said piece of congestion information.

The advantages stated for any one of the features of the signaling method according to the first aspect can be transferred directly to the node of a network according to the second aspect.

According to a third aspect, the subject of the invention is a system for signaling a piece of congestion information, designed to signal a piece of congestion information relating to a first data stream transmitted by a first node, the first data stream and at least one second data stream being conveyed by a second node. The system comprises:
 the first node, comprising a sending module designed to send data packets via the first stream, and a reception module designed to receive signaling for a piece of congestion information from the second node;
 the second node being designed according to the second aspect;
 a third node, by means of which the first data stream is conveyed, the third node comprising a marking module designed to mark data packets relating to a congestion situation for conveyance of said second stream in a data transfer plane.

The advantages stated for any one of the features of the signaling method according to the first aspect can be transferred directly to the signaling system according to the third aspect.

According to a fourth aspect, the invention also concerns a program for a node, comprising program code instructions intended to control the execution of the steps of the method described above when said program is executed by said node and a recording medium that can be read by a node, on which a program for a node is recorded.

BRIEF DESCRIPTION OF THE DRAWINGS

The invention will be better understood with the aid of the description that follows for particular embodiments, with reference to the appended drawings, in which.

DETAILED DESCRIPTION OF ILLUSTRATIVE EMBODIMENTS

Figure 1:
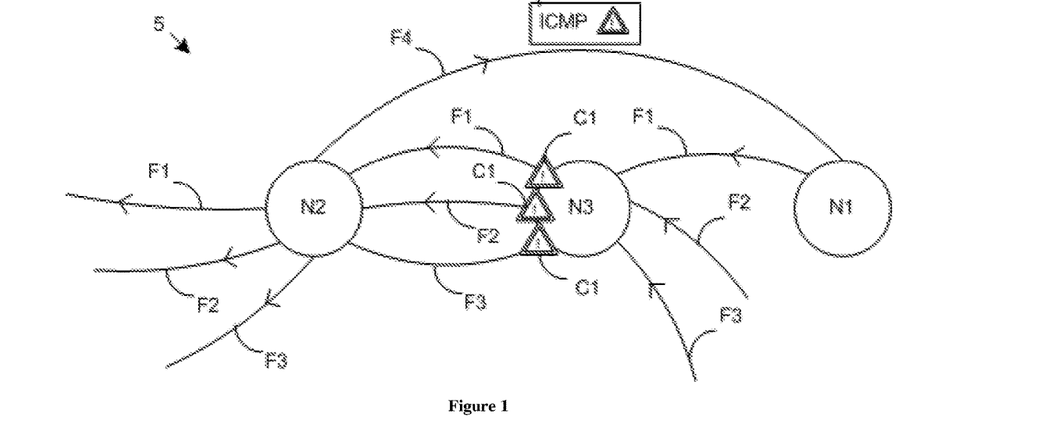
FIG. 1 shows a system for signaling a piece of congestion information in a communication network according to a particular embodiment.

FIG. 1 shows a system for signaling a piece of congestion information in a communication network 5 according to a particular embodiment. The communication network 5 is particularly a packet communication network. The system comprises three nodes N1, N2 and N3. A node is defined as an element involved in a service chain of a network. By way of nonlimiting example, it is physical equipment of a network (e.g. switch, router, firewall, GGSN, for "Gateway GPRS Support Node") or even elements of a data processing center, "Data Center" (e.g. interconnection manager or "DCI manager", for "Data Center Interconnection Manager", operating system, controller). By way of illustrative example, the node N1 provides a file transfer service and the nodes N2 and N3 are routers.

The nodes N2 and N3 convey packets transmitted in one plane, referred to as transfer plane. Three streams F1, F2 and F3 of data packets are shown. More precisely, a stream is a succession of packets transmitted between a transmitting node and a receiving node for these packets. The packets transmitted by the node N1 belong to the stream F1 and are conveyed by the nodes N2 and N3. The nodes N2 and N3 also convey the streams F2 and F3. There is no limitation as to the number of streams conveyed by the nodes N2 and N3. By way of example, the stream F1 is an FTP, for "File Transfer Protocol", stream, the stream F2 is a realtime video stream and the stream F3 is a realtime audio stream. In another plane, referred to as command plane, the nodes interchange control information by means of a control stream F4, for example using the ICMP, for "Internet Control Message Protocol", protocol, defined in a document RFC 792 from the IETF, for "Internet Engineering Task Force". The nodes can also interchange control information from extensions of the ICMP protocol (e.g. extension for the MPLS protocol defined in the document RFC 4950 from the IETF, extension of ICMP as defined in the document RFC 4884), or any other type of equivalent control protocol. Naturally, the connectivity of a node is not restricted to the simplified network as shown in FIG. 1. A node is in fact able to convey packets to a plurality of other nodes.

When a node detects congestion, for example on a queue intended to store the packets at the output of the node before retransmission to another node, the packets are marked by the node before retransmission using an information field ECN, for "Explicit Congestion Notification". It is emphasized here that the marking is made using statistical methods, and that it is therefore not possible to guarantee marking of the packets for each of the streams conveyed by the node. The information field ECN comprises an information subfield CE, for "Congestion Experienced". The packets are thus marked by setting the information subfield CE to the value one. By way of illustrative example, the node N3 detects congestion C1 on one of its queues before retransmission to the node N2, and marks certain packets belonging to the stream F2.

The node N2 obtains the congestion information C1 on reception of the marked packets belonging to the stream F2. The node N2 verifies which is the stream with the lowest priority among the streams F1, F2 and F3. By way of example, this verification is performed according to a policy of the operator in association with certain priority criteria (e.g. user profiles, communication protocol used, application generating the streams). By way of example, the stream with the lowest priority is the stream F1.

Once the priority of the streams F2 and F3 over the stream F1 has been verified, this information is transmitted to the node N1 transmitting the stream F1 in the control stream F4 by means of a control message M1 carrying the piece of congestion information. By way of example, this message M1 is an ICMP message "Net partially unreachable", an extension of an ICMP message of "Destination unreachable" type as defined in the document RFC 792 from the IETF in order to signal congestion. Such a message particularly allows indication of a piece of information relating to the nature of the congestion, particularly by specifying whether it is congestion relating to:
- one or more elements of the network transporting packets (i.e. ICMP message "Network partially unreachable");
- a machine (i.e. ICMP message "Host partially unreachable" indicating that resources are reaching saturation, or a very low state of charge of a battery, for example);
- a particular service (i.e. ICMP message "Port partially unreachable");
- a protocol (i.e. ICMP message "Protocol partially unreachable").

The node N1 receives the piece of congestion information C1 and can then reduce the bit rate for transmission of the packets belonging to the stream F1, for example. Taking account of the congestion C1 for the stream F1 thus allows the conveyance of the streams F2 and F3 to be favored.

If the priority level of the streams F1, F2 and F3 is identical, then a message is not sent by the node N2 to the node N1.

It is also emphasized that in a particular embodiment, when after an observation time, the congestion situation persists, the node N2 determines which is the stream with the lowest priority among the streams for which a control message has not yet been sent. For this, before the control message M1 is sent, a time delay is activated, for example. If, on expiry of this time delay, packets marked by the node N3 are still obtained by the node N2, then the latter verifies which of the streams F2 and F3 has the lowest priority. By way of example, according to the policy of the operator that is implemented by the node N2, the stream F3 has lower priority than the stream F2. As described above, a new control message is then transmitted to the node transmitting the stream F2. If the time delay has not expired, it is deactivated when the node N2 no longer observes packets marked by the node N3.

In another embodiment, the node N1 is a VPN, "Virtual Private Network", server allowing data packets from a local area network to be injected into the stream F1.

Figure 2:
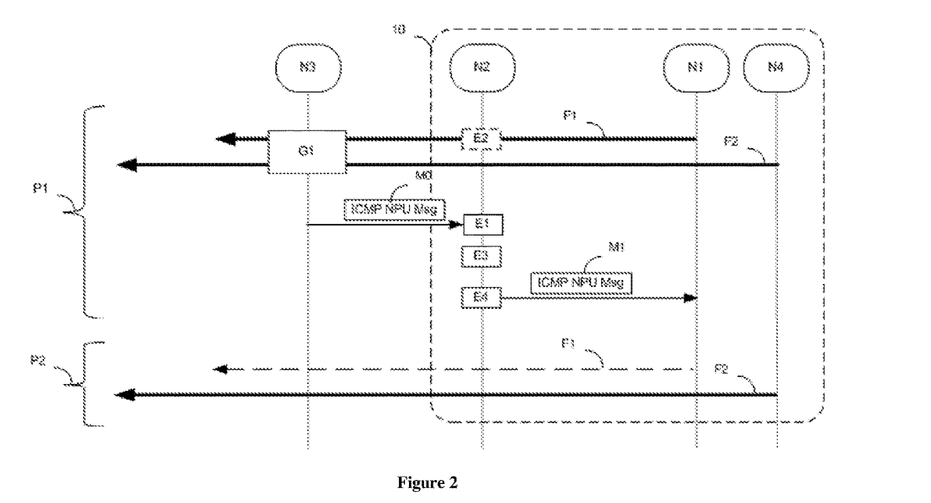
FIG. 2 shows an overview diagram of the steps of the signaling method and of the interchanges between nodes implementing the method according to a first particular embodiment.

FIG. 2 schematically shows the steps of the signaling method that are implemented according to a first particular embodiment.

In this first particular embodiment, the nodes N1, N2 and N4 are elements of a data processing center 10, for example, and the node N3 is a router located in an exterior network. Still by way of illustrative example, the node N1 provides a data backup service, the node N2 is a router for interconnection with the exterior network, and the node N4 provides a realtime video surveillance service. Two streams F1-F2 transmitted by the node N1 and the node N4, respectively, are conveyed to the outside of the data processing center 10, particularly by passing through the nodes N2 and N3. In a first phase P1, the packets transmitted on these streams are transmitted at standard bit rates for transmission in the absence of recorded congestion, and then a node transmitting one of these streams receives signaling for a piece of congestion information and reduces its transmission bit rate in a phase P2.

In this embodiment, congestion is detected in the exterior network by the node N3. The piece of congestion information is then transmitted from the exterior network to the data processing center by the node N3, which signals it to the node N2.

In a step E1, the node N2 receives signaling for a piece of congestion information from the node N3 that has detected congestion (G1). The piece of congestion information is thus obtained by the node N2 from an ICMP control message. This ICMP message is an ICMP message "Net partially unreachable" M0, for example. The message M0 also carries the piece of congestion information relating to the congestion detected by the node N3. This translates into encapsulation of a header of a packet belonging to the stream F2 marked using ECN fields, for example.

In a step E2, the node N2 extracts an identifier of the node N1 from a header of one of the packets belonging to the stream F1. More precisely, this identifier corresponds to an address in the network and to a port number of the node N1.

In a step E3, the node N2 verifies that the stream F1 has a priority level lower than that of the stream F2. For this, the node N2 determines the type of the congestion from the piece of congestion information contained in the control message M0 received in step E1. The ICMP message "Net partially unreachable" M0 indicates that the congestion relates to one or more pieces of equipment of the network, for example the saturation of a queue at the output of the node N3. A piece of service class information contained in the header of the packets belonging to the streams F1 and F2 allows the node N2 to determine the policy to be implemented for the priority level of each of the two streams, for example. The service class information is obtained by virtue of the ToS, for "Type of Service", field of the packet headers IP, for example. This latter piece of information may also be obtained by virtue of the DSCP, for "Differentiated Services Code Point", field when a mechanism of DiffServ, for "Differentiated Services", type for differentiated processing of the packets as defined by the documents RFC 2474 and RFC 2475 from the IETF is implemented in the network. By way of example, for four service classes defined by the DSCP field that are denoted 1 to 4, a packet of service class 1 benefits from the highest priority level; a packet of service class 4 benefits from the lowest priority level. In this case, it is assumed that the packets belonging to the streams F1 and F2 have a priority level defined at 1 and at 3, respectively.

Having verified that the priority level of the stream F1 is lower than that of the stream F2, the node 2 prepares an ICMP control message "Net partially unreachable" M1 in which the piece of congestion information carried by the message M0 is copied, and then sends it to the node N1 in a step E4.

On receiving the signaling of the piece of congestion information, the node N1 performs an action to attempt to lessen the congestion, for example reduces the bit rate for transmission of the packets transmitted on the stream F1.

Figure 3:
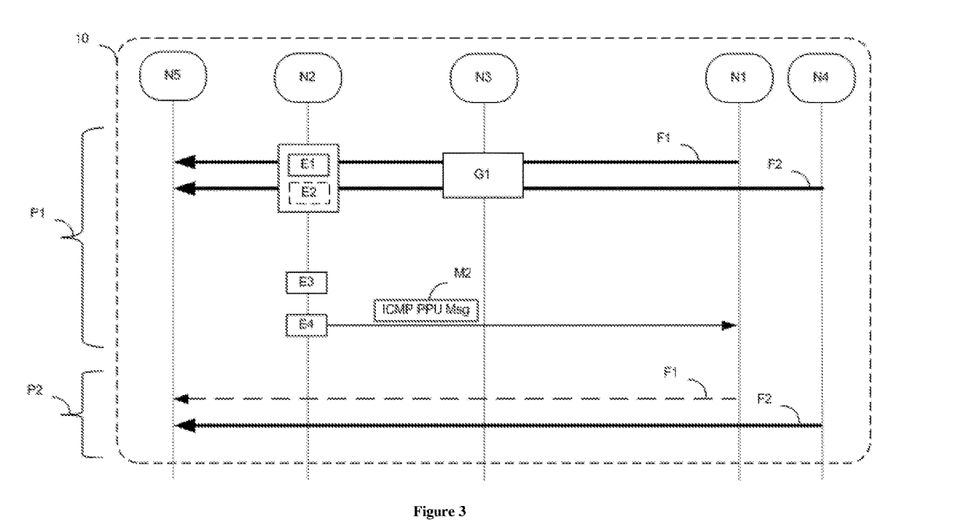
FIG. 3 shows an overview diagram of the steps of the signaling method and of the interchanges between nodes implementing the method according to a second particular embodiment.

FIG. 3 schematically shows the steps of the signaling method that are implemented according to a second particular embodiment.

In this second particular embodiment, nodes N1-N5 form part of a data processing center 10. The node N1 provides a data backup service, the node N2 is an operating system accommodating a storage service provided by the node N5, the node N3 is a router and the node N4 provides a realtime video surveillance service. The nodes N1 and N4 are in competition for the use of storage resources provided by the node N5. Two streams F1 and F2 transmitted by the node N1 and the node N4, respectively, are conveyed by the nodes N2 and N3. In a first phase P1, the packets of these streams are transmitted at standard bit rates for transmission in the absence of recorded congestion, and then a node transmitting one of these streams receives signaling for a piece of congestion information and, in a phase P2, performs an action to attempt to lessen the congestion, for example reducing its transmission bit rate.

In this embodiment, the method is entirely implemented in a data processing center 10 by the node N2. Congestion is detected in the data processing center 10 by the node N3.

In step E1, the node N2 receives marked packets belonging to the stream F2 from the node N3. By way of example, this marking is the result of the node N3 detecting (G1) the congestion indicating an onset of saturation on its queues. The marking typically uses the ECN notification mechanism described above, and constitutes a piece of congestion information relating to the stream F2, for example.

In step E2, the node N2 extracts an identifier of the service provided by the node N1 from one of the data packets transmitted on the stream F1. This identifier corresponds particularly to a network address and to a port number used by this service.

In step E3, the node N2 verifies that the stream F1 has a priority level lower than that of the stream F2. According to a prioritization policy for the services provided by the operator of the network, the service provided by the node N4 has priority in relation to the service provided by the node N1, with regard to access to the service represented by the node N5. The piece of congestion information received for the stream F2 transmitted by the node N4 is then translated into an ICMP control message "Port partially unreachable" M2 having the port number of the service provided by the node N1 (extracted in step E2).

The control message M2 is then sent in step E4 to the node N1. More precisely, the message M2 is received from the operating system accommodating the service provided by the node N1. The latter determines, from the port number contained in the message, the service for which an action to attempt to lessen the congestion can be taken, and informs this service. By way of example, the service provided by the node N1 is informed that it needs to reduce its bit rate for transmission of packets by an alert from a programming interface (or API for "Application Programming Interface"). The node N1 then reduces the bit rate of the transmitted stream F1.

Figure 4:
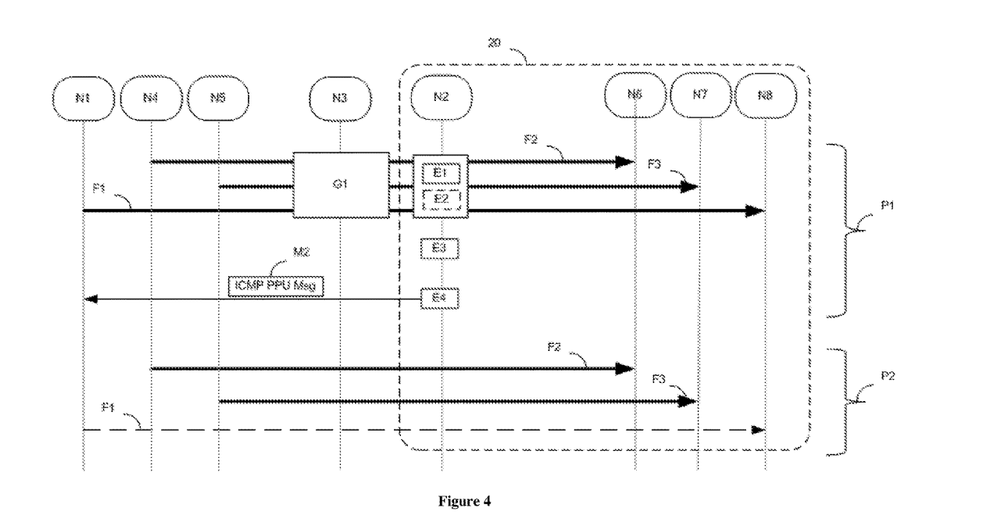
FIG. 4 shows an overview diagram of the steps of the signaling method and of the interchanges between nodes implementing the method according to a third particular embodiment.

FIG. 4 schematically shows the steps of the signaling method that are implemented according to a third particular embodiment.

In this third particular embodiment, the nodes N2, N6, N7 and N8 form part of a home network 20. The node N2 is a modem router, for example a Livebox, the interface between the home network 20 and an exterior network. The node N6 implements a video conferencing session, the node N7 implements a streaming session and the node N8 implements an FTP session. The nodes N6, N7 and N8 are terminals, for example. The video conferencing session (implemented by the node N6) is associated with a video conferencing service provided by a node N4, the streaming session (implemented by the node N7) is associated with a streaming service provided by a node N5 and the FTP session (implemented by the node N8) is associated with an FTP service provided by a node N1. These three services come from a network that is separate from a home network 20. Three streams F1, F2 and F3 of respective transmitters N1, N4 and N5 are conveyed by the nodes N2 and N3 to the nodes N8, N6 and N7, respectively. In a first phase P1, the packets transmitted on these streams are transmitted at standard bit rates for transmission in the absence of recorded congestion, and then a node transmitting one of these streams receives signaling for a piece of congestion information and performs an action to attempt to lessen the congestion in a phase P2.

In this embodiment, the method is implemented by the node N2 located in a home network 20. Congestion is detected in the exterior network by the node N3. The piece of congestion information is transmitted to the node N2 by means of marked packets in the data transfer plane.

In step E1, the node N2 receives marked packets belonging to one or more streams F1-F3 from the node N3. This marking as described above for the second embodiment results from the node N3 detecting (G1) congestion indicating an onset of saturation on its queues, for example, and uses the ECN notification mechanism.

In step E2, the node N2 extracts an identifier for each of the services provided by the nodes N1, N4 and N5 from the data packets transmitted on their respective streams F1, F2 and F3. This identifier consists of a network address and a port number.

In step E3, the node N2 verifies the relative priority of each of the streams in relation to the other streams, and particularly determines that the stream having the lowest priority is the stream F1. This prioritization is the result of a policy of the operator that favors realtime streams, for example.

Still in step E3, the piece of congestion information obtained from the marked packets (step E1) is then translated by the node N2 into an ICMP control message "Port partially unreachable" M2 having the source port number of the service provided by the node N1.

The control message M2 is then directly sent in step E4 to the node N1 using the address and the port of the FTP service that are associated with the latter. The piece of congestion information from the marked data packets is furthermore ignored by the operating system accommodating the video conferencing, streaming in FTP services (nodes N6, N7 and N8, respectively) so as not to disrupt the quality of service of the video conferencing and streaming sessions.

On receiving the control message M2, the node N1 reduces the bit rate for transmitting the packets sent in the stream F1.

Figure 5:
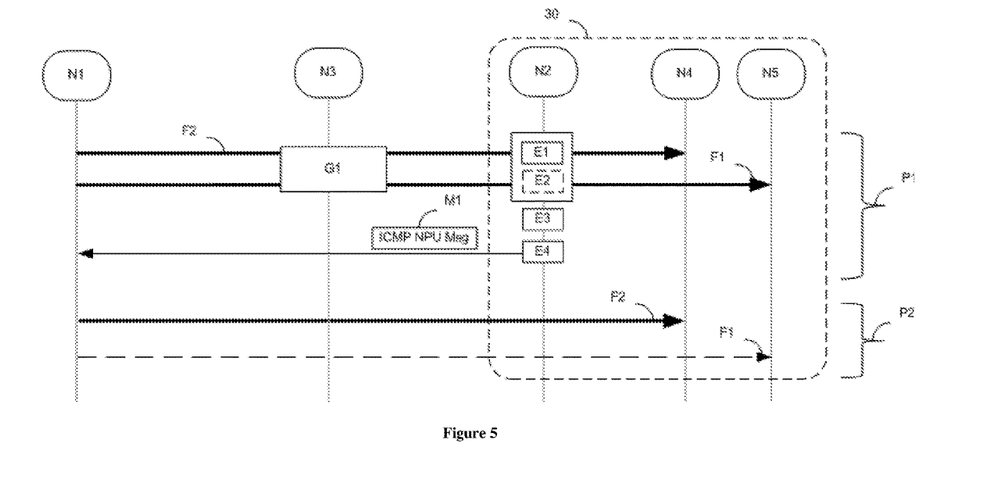
FIG. 5 shows an overview diagram of the steps of the signaling method and of the interchanges between nodes implementing the method according to a fourth particular embodiment.

FIG. 5 schematically shows the steps of the signaling method that are implemented according to a fourth particular embodiment.

In this fourth particular embodiment, the nodes N2, N4 and N5 form part of a mobile network 30. By way of example, the node N2 is a piece of GGSN equipment, the node N4 is a terminal subscribed to premium services and the node N5 is a terminal subscribed to nonpremium services. The node N2 acts as a gateway between the mobile network 10 and an exterior IP network to which the nodes N1 and N3 belong. The node N1 provides a streaming service and the node N3 is a router. The mobiles represented by the nodes N4 and N5 both access the streaming service provided by the node N1. The streams F1 and F2 bound for the node N5 and the node N4, respectively, are transmitted by one and the same transmitter, the node N1. They are conveyed by means of the nodes N2 and N3. In a first phase P1, the packets transmitted on these streams are transmitted at standard bit rates for transmission in the absence of recorded congestion, and then a node transmitting one of these streams receives signaling for a piece of congestion information and performs an action to attempt to lessen the congestion in a phase P2.

In this embodiment, the method is implemented by the node N2 in a mobile network 30. Congestion is detected (G1) in the exterior IP network by the node N3. The piece of congestion information is transmitted to the node N2 by means of marked packets in the data transfer plane.

In step E1, the node N2 receives marked packets belonging to the stream F1 and/or F2 from the node N3. This marking as described above for the second embodiment results from the node N3 detecting (G1) congestion indicating an onset of saturation on its queues, for example, and uses the ECN notification mechanism.

In step E2, the node N2 extracts an identifier of the node N1 such as a network address in association with the port number, and an identifier for each of the mobiles accessing the service represented by N1, from a PDP, for "Packet Data Protocol", context associated with each of the streams F1 and F2, for example.

In step E3, the node N2 verifies the relative priority of each of the streams in relation to the other streams. The priority of the streams is determined from the user profiles associated with the nodes N4 and N5. By way of example, these user profiles are retrieved by the node N2 by interrogating a piece of HLR, for "Home Location Register", equipment. In particular, the HLR equipment is located in the mobile network 30 when the user profile to be retrieved is that of a subscriber of the operator of the network 30. If the user profile to be retrieved is not that of a subscriber of the operator of network 30, then the HLR equipment interrogated is located in a network of an operator with which the user is a subscriber. The node N2 determines from the user profiles obtained that the stream F1 has lower priority than the stream F2, since it is associated with a nonpremium user profile.

Still in step E3, the piece of congestion information obtained from the marked packets of the streams F1 and F2 (step E1) is translated by the node N2 into an ICMP control message "Network partially unreachable" M1 comprising an identifier of the service and the port used by the node N1.

The control message M1 is then sent in step E4 to the node N1. More precisely, the message M1 is received by the operating system accommodating the service provided by the node N1. The latter determines from the port number contained in the message the service for which the bit rate for transmission of the packets transmitted on the associated stream needs to be reduced, and informs this service. The service provided by the node N1 is informed that it needs to reduce its bit rate for transmission of packets by an alert from a programming interface (or API for "Application Programming Interface"), for example. The node N1 then reduces the bit rate of the transmission stream F1.

Figure 6:
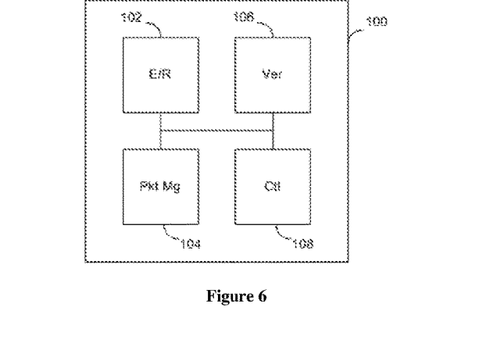
FIG. 6 shows a node of a network according to a particular embodiment.

A node 100 of the network will now be described in relation to FIG. 6. Such a node 100 is particularly designed to signal a piece of congestion information relating to a first data stream transmitted by a second node, the first data stream and at least one second data stream being conveyed by the node 100. The node 100 particularly comprises:

- a transmission and reception module 102, designed to transmit and receive packets in a transfer plane;
- a packet processing module 104, designed to obtain a piece of congestion information relating to the second data stream, the piece of congestion information indicating that a third node, by means of which the first data stream is conveyed, has detected a congestion situation for conveyance of the second stream in the transfer plane;
- a verification module 106, designed to verify that the first data stream has a priority level lower than that of the second data;
- a control module 108, designed to interchange control information in the command plane with another piece of node equipment.

The module 102 is also designed to process packets in the transfer plane, and particularly to obtain from a packet a piece of information relating to congestion and to insert it into a control message to be transmitted by the control module 106.

The invention is implemented by means of software and/or hardware components. With this in mind, the term "module" can, in this document, correspond both to a software component and to a hardware component or to a set of hardware and/or software components, which is capable of implementing a function or a set of functions, according to what is described above for the module in question.

A software component corresponds to one or more computer programs, one or more subroutines of a program or, more generally, to any element of a program or of a piece of software. Such a software component is stored in memory and then loaded and executed by a data processor of a physical entity and is able to access the hardware resources of this physical entity (memories, recording media, communication buses, electronic input/output cards, user interfaces, etc.).

In the same way, a hardware component corresponds to any element of a hardware assembly. It may be a programmable or nonprogrammable hardware component, with or without an integrated processor for executing software. By way of example, it is an integrated circuit, a chip card, an electronic card for executing a piece of firmware, etc.

In a particular embodiment, the modules 102, 104, 106 and 108 are designed to implement the signaling method described above. They are preferably software modules comprising software instructions for executing those of the steps of the signaling method described above that are implemented by a network node. The invention therefore also concerns:

- a program for a network node, comprising program code instructions that are intended to control the execution of the steps of the signaling method described above when said program is executed by said node;
- a recording medium that can be read by a node, on which the program for a node is recorded.

The software modules can be stored in or transmitted by a data medium. The latter may be a hardware storage medium, for example a CD-ROM, a floppy disk or a hard disk, or else a transmission medium such as an electrical, optical or radio signal, or a telecommunication network.

Although the present disclosure has been described with reference to one or more examples, workers skilled in the art will recognize that changes may be made in form and detail without departing from the scope of the disclosure and/or the appended claims.

The invention claimed is:

1. A method comprising:
signaling a piece of congestion information relating to a first data stream transmitted by a first node in a network, said signaling comprising the following acts implemented by a second node, by which the first data stream and at least one second data stream are conveyed:
obtaining a piece of congestion information relating to the second data stream, said piece of congestion information indicating that a third node, by which the first data stream is conveyed, has detected a congestion situation for conveyance of said second stream in a data transfer plane;
verifying that the first data stream has a priority level lower than that of the second data stream; and
sending a control message in a command plane to the first node transmitting the first stream, said control message carrying said piece of congestion information and comprising an identifier of a service provided by means of first data stream, the identifier being extracted from the first data stream.

2. The signaling method as claimed in claim 1, further comprising obtaining an identifier of the first node from a data packet belonging to the first stream.

3. The signaling method as claimed in claim 1, in which said piece of congestion information is obtained from a data packet belonging to the second stream.

4. The signaling method as claimed in claim 1, in which said piece of congestion information is obtained in a command plane from a control message carrying said piece of congestion information.

5. The signaling method as claimed in claim 1, further comprising an observation act after the piece of congestion information is sent, at the end of which when the congestion situation is extended to the third node, the verification and sending acts are repeated for a third stream transmitted by a fourth node.

6. The signaling method as claimed in claim 1, in which the priority level belongs to a group comprising consisting of a priority level associated with a data stream, a priority level associated with a transmitter of a data stream, a priority level associated with a user receiving a data stream, a priority level associated with a communication protocol for a data stream, a priority level associated with an application managing a data stream.

7. A node in a network, referred to as "first node", designed to signal a piece of congestion information relating to a first data stream transmitted by a second node, the first data stream and at least one second data stream being conveyed by said first node, comprising:
- a processing module, which obtains a piece of congestion information relating to the second data stream, said piece of congestion information indicating that a third node, by which the first data stream is conveyed, has detected a congestion situation for conveyance of said second stream in a data transfer plane;
- a verification module, which verifies that the first data stream has a priority level lower than that of the second data stream; and
- a control module, which sends a control message in a command plane to said second node, said control message carrying said piece of congestion information and comprising an identifier of a service provided by means of first data stream, the identifier being extracted from the first data stream.

8. A system for signaling a piece of congestion information, designed to signal a piece of congestion information relating to a first data stream transmitted by a first node, the first data stream and at least one second data stream being conveyed by a second node, said system comprising:
- said first node, comprising a sending module, which sends data packets via said first stream, and a reception module, which receives signaling for a piece of congestion information from said second node;
- said second node, which comprises:
  - a processing module, which obtains the piece of congestion information relating to the second data stream, said piece of congestion information indicating that a third node, by which the first data stream is conveyed, has detected a congestion situation for conveyance of said second stream in a data transfer plane;
  - a verification module, which verifies that the first data stream has a priority level lower than that of the second data stream; and
  - a control module, which sends a control message in a command plane to said first node, said control message carrying said piece of congestion information and comprising an identifier of a service provided by means of first data stream, the identifier being extracted from the first data stream;
- said third node, by which the first data stream is conveyed, said third node comprising a marking module, which marks data packets relating to the congestion situation for conveyance of said second stream in the data transfer plane.

9. A non-transitory computer-readable medium comprising a program stored thereon for a second node, comprising program code instructions to control execution of a method of signaling, when said program is executed by said node, wherein the instructions configured said second node to perform acts of:
- signaling a piece of congestion information relating to a first data stream transmitted by a first node in a network, said signaling comprising the following acts implemented by the second node, by which the first data stream and at least one second data stream are conveyed:
- obtaining a piece of congestion information relating to the second data stream, said piece of congestion information indicating that a third node, by which the first data stream is conveyed, has detected a congestion situation for conveyance of said second stream in a data transfer plane;
- verifying that the first data stream has a priority level lower than that of the second data stream; and
- sending a control message in a command plane to the first node transmitting the first stream, said control message carrying said piece of congestion information and comprising an identifier of a service provided by means of first data stream, the identifier being extracted from the first data stream.

* * * * *